US008728974B2

(12) United States Patent
Yang et al.

(10) Patent No.: US 8,728,974 B2
(45) Date of Patent: May 20, 2014

(54) POLLUTANT EMISSION CONTROL SORBENTS AND METHODS OF MANUFACTURE AND USE

(75) Inventors: Xiaolin David Yang, Edison, NJ (US); Pascaline Harrison Tran, Holmdel, NJ (US); Lawrence Shore, Jerusalem (IL)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/566,521

(22) Filed: Aug. 3, 2012

(65) Prior Publication Data

US 2012/0292564 A1    Nov. 22, 2012

Related U.S. Application Data

(60) Division of application No. 12/329,246, filed on Dec. 5, 2008, which is a continuation-in-part of application No. 11/860,148, filed on Sep. 24, 2007.

(51) Int. Cl.
*B01J 20/00* (2006.01)
*B01D 53/02* (2006.01)

(52) U.S. Cl.
USPC ............................................. 502/400; 95/134

(58) Field of Classification Search
CPC ........ B01J 20/0248; B01J 20/10; B01J 20/12; B01J 20/165; B01J 20/046; B01J 20/28007; B01J 20/30; B01J 20/3078; B01D 53/64; B01D 2257/602
USPC ............ 502/400, 407, 412, 415; 96/108–154; 95/134
See application file for complete search history.

(56) References Cited

U.S. PATENT DOCUMENTS

| | | | |
|---|---|---|---|
| 3,663,165 | A | 5/1972 | Haden, Jr. et al. |
| 3,793,185 | A | 2/1974 | Whitehurst et al. |
| 4,094,777 | A | 6/1978 | Sugier et al. |
| 4,120,782 | A | 10/1978 | Audeh et al. |
| 4,493,902 | A | 1/1985 | Brown et al. |
| 4,699,893 | A | 10/1987 | Andrews et al. |
| 4,708,853 | A | 11/1987 | Matviya et al. |
| 4,895,638 | A | 1/1990 | Aufdembrink et al. |
| 4,902,662 | A | 2/1990 | Toulhoat et al. |
| 5,306,474 | A | 4/1994 | Kida et al. |
| 5,405,593 | A | 4/1995 | Knudson |

(Continued)

FOREIGN PATENT DOCUMENTS

| | | |
|---|---|---|
| EP | 0043759 A1 | 1/1982 |
| EP | 0145539 | 6/1985 |

(Continued)

OTHER PUBLICATIONS

Non-Final Office Action in U.S. Appl. No. 12/707,450, mailed Aug. 24, 2012, 18 pgs.

(Continued)

*Primary Examiner* — Anthony J Zimmer
(74) *Attorney, Agent, or Firm* — Elizabeth Pietrowski

(57) ABSTRACT

Sorbents for removal of mercury and other pollutants from gas streams, such as a flue gas stream from coal-fired utility plants, and methods for their manufacture and use are disclosed. Embodiments include brominated sorbent substrate particles having a carbon content of less than about 10%. Other embodiments include one or more oxidatively active halides of a nonoxidative metal dispersed on sorbent substrate particles mixed with activated carbon in an amount up to 30% by weight.

8 Claims, 3 Drawing Sheets

(56) References Cited

U.S. PATENT DOCUMENTS

| | | |
|---|---|---|
| 5,409,522 A | 4/1995 | Durham et al. |
| 5,472,594 A | 12/1995 | Tsang et al. |
| 5,505,766 A | 4/1996 | Chang |
| 5,569,436 A | 10/1996 | Lerner |
| 5,607,496 A | 3/1997 | Brooks |
| 5,618,508 A | 4/1997 | Suchenwirth et al. |
| 5,695,726 A | 12/1997 | Lerner |
| 5,702,589 A | 12/1997 | Tsang et al. |
| 5,827,352 A | 10/1998 | Altman et al. |
| 5,854,173 A | 12/1998 | Chang et al. |
| 5,868,829 A | 2/1999 | Biermann et al. |
| 5,897,688 A | 4/1999 | Voogt et al. |
| 5,948,143 A | 9/1999 | Sjostrom et al. |
| 6,027,551 A | 2/2000 | Hwang et al. |
| 6,136,072 A | 10/2000 | Sjostrom et al. |
| 6,375,909 B1 | 4/2002 | Dangtran et al. |
| 6,521,021 B1 | 2/2003 | Pennline et al. |
| 6,558,454 B1 | 5/2003 | Chang et al. |
| 6,638,485 B1 | 10/2003 | Iida et al. |
| 6,656,347 B2 | 12/2003 | Stockwell et al. |
| 6,673,235 B2 | 1/2004 | Harris et al. |
| 6,695,894 B2 | 2/2004 | Chang et al. |
| 6,712,878 B2 | 3/2004 | Chang et al. |
| 6,719,828 B1 | 4/2004 | Lovell et al. |
| 6,770,250 B2 | 8/2004 | Cooper et al. |
| 6,808,692 B2 | 10/2004 | Oehr |
| 6,818,043 B1 | 11/2004 | Chang et al. |
| 6,953,494 B2 | 10/2005 | Nelson, Jr. |
| 7,048,781 B1 | 5/2006 | Lovell |
| 7,276,152 B2 | 10/2007 | Lin et al. |
| 8,226,913 B2 | 7/2012 | Comrie |
| 8,313,323 B2 | 11/2012 | Comrie |
| 8,313,543 B2 | 11/2012 | Nalepa |
| 2003/0103882 A1 | 6/2003 | Biermann et al. |
| 2003/0104937 A1 | 6/2003 | Sinha |
| 2003/0118493 A1 | 6/2003 | Cooper et al. |
| 2003/0176396 A1 | 9/2003 | Shea et al. |
| 2003/0206843 A1 | 11/2003 | Nelson |
| 2004/0003716 A1 | 1/2004 | Nelson |
| 2004/0081606 A1 | 4/2004 | Cooper et al. |
| 2004/0202596 A1 | 10/2004 | Honjo et al. |
| 2005/0129597 A1 | 6/2005 | Cross et al. |
| 2005/0181931 A1 | 8/2005 | Mouri et al. |
| 2005/0199554 A1 | 9/2005 | Goolsby et al. |
| 2006/0205592 A1 | 9/2006 | Chao et al. |
| 2006/0210463 A1 | 9/2006 | Comrie |
| 2006/0230930 A1 | 10/2006 | Knaebel |
| 2007/0119300 A1 | 5/2007 | Yang et al. |
| 2007/0122327 A1 | 5/2007 | Yang et al. |
| 2007/0122619 A1 | 5/2007 | Yang et al. |
| 2007/0140940 A1 | 6/2007 | Varma et al. |
| 2007/0289447 A1 | 12/2007 | Yang et al. |
| 2007/0292328 A1 | 12/2007 | Yang et al. |
| 2008/0210599 A1 | 9/2008 | O'Connor et al. |
| 2009/0136401 A1 | 5/2009 | Yang et al. |

FOREIGN PATENT DOCUMENTS

| | | |
|---|---|---|
| EP | 0271618 | 6/1988 |
| EP | 0480603 A2 | 4/1992 |
| EP | 0484234 A2 | 5/1992 |
| EP | 0930091 | 7/1999 |
| GB | 2124249 A | 2/1984 |
| WO | WO-0185307 | 11/2001 |
| WO | WO-2007/149833 | 12/2007 |
| WO | WO-2007/149837 | 12/2007 |

OTHER PUBLICATIONS

"Control of Mercury Emissions From Coal-Fired Electric Utility Boilers", *EPA Report*, EPA-600/R-01-109 Apr. 2002.

"Final Office Action in U.S. Appl. No. 11/860,148, mailed Mar. 16, 2011", 16 pgs.

"Final Office Action in U.S. Appl. No. 11/860,148, mailed May 9, 2012", 10 pgs.

"Final Office Action in U.S. Appl. No. 12/329,246, dated Jan. 6, 2012", 14 pgs.

"Non-Final Office Action in U.S. Appl. No. 11/860,148, dated Oct. 5, 2010", 12 pgs.

"Non-Final Office Action in U.S. Appl. No. 11/860,148, mailed Oct. 7, 2011", 11 pgs.

"Non-Final Office Action in U.S. Appl. No. 12/329,246 dated Jun. 28, 2012", 11 pgs.

"Non-Final Office Action in U.S. Appl. No. 12/329,246, mailed Mar. 24, 2011", 17 pgs.

"PCT/US2006/0044711—PCT International Search Report", 3 pgs.

Granite, Evan J. et al., "Novel Sorbents for Mercury Removal from Flue Gas", *Ing. Eng. Chem. Res.*, 39 2000, 1020-1029.

Final Office Action in U.S. Appl. No. 12/707,450, mailed Dec. 13, 2012, 10 pgs.

"Final Office Action in U.S. Appl. No. 12/329,246", dated Mar. 5, 2013, 16 pages.

Final Office Action in U.S. Appl. No. 12/707,450, dated Aug. 15, 2013, 6 pgs.

Non-Final Office Action in U.S. Appl. No. 12/707,450, mailed Apr. 25, 2013, 8 pgs.

POLLUTANT EMISSION CONTROL SORBENTS AND METHODS OF MANUFACTURE AND USE

CROSS REFERENCE TO RELATED APPLICATIONS

This application is a divisional of U.S. patent application Ser. No. 12/329,246, filed Dec. 5, 2008, which is a continuation-in-part of Ser. No. 11/860,148, filed Sep. 24, 2007, the contents of which are specifically incorporated by reference herein in their entirety.

TECHNICAL FIELD

Embodiments of the invention relate to sorbents for the removal of pollutants such as mercury from gas streams, methods for manufacturing sorbents and the use of sorbents in pollution control.

BACKGROUND

Emission of pollutants, for example, mercury, from combustion gas sources such as coal-fired and oil-fired boilers has become a major environmental concern. Mercury (Hg) is a potent neurotoxin that can affect human health at very low concentrations. The largest source of mercury emission in the United States is coal-fired electric power plants. Coal-fired power plants account for between one-third and one-half of total mercury emissions in the United States. Mercury is found predominantly in the vapor-phase in coal-fired boiler flue gas. Mercury can also be bound to fly ash in the flue gas.

On Dec. 15, 2003, the Environmental Protection Agency (EPA) proposed standards for emissions of mercury from coal-fired electric power plants, under the authority of Sections 111 and 112 of the Clean Air Act. In their first phase, the standards could require a 29% reduction in emissions by 2008 or 2010, depending on the regulatory option chosen by the government. In addition to EPA's regulatory effort, in the United States Congress, numerous bills recently have been introduced to regulate these emissions. These regulatory and legislative initiatives to reduce mercury emissions indicate a need for improvements in mercury emission technology.

There are three basic forms of Hg in the flue gas from a coal-fired electric utility boiler: elemental Hg (referred to herein by the symbol $Hg^0$); compounds of oxidized Hg (referred to herein the symbol $Hg^{2+}$); and particle-bound mercury. Oxidized mercury compounds in the flue gas from a coal-fired electric utility boiler may include mercury chloride ($HgCl_2$), mercury oxide (HgO), and mercury sulfate ($HgSO_4$). Oxidized mercury compounds are sometimes referred to collectively as ionic mercury. This is because, while oxidized mercury compounds may not exist as mercuric ions in the boiler flue gas, these compounds are measured as ionic mercury by the speciation test method used to measure oxidized Hg. The term speciation is used to denote the relative amounts of these three forms of Hg in the flue gas of the boiler. High temperatures generated by combustion in a coal boiler furnace vaporize Hg in the coal. The resulting gaseous $Hg^0$ exiting the furnace combustion zone can undergo subsequent oxidation in the flue gas by several mechanisms. The predominant oxidized Hg species in boiler flue gases is believed to be $HgCl_2$. Other possible oxidized species may include HgO, $HgSO_4$, and mercuric nitrate monohydrate ($Hg(NO_3)_2 \cdot H_2O$).

Gaseous Hg (both $Hg^0$ and $Hg^{2+}$) can be adsorbed by the solid particles in boiler flue gas. Adsorption refers to the phenomenon where a vapor molecule in a gas stream contacts the surface of a solid particle and is held there by attractive forces between the vapor molecule and the solid. Solid particles are present in all coal-fired electric utility boiler flue gas as a result of the ash that is generated during combustion of the coal. Ash that exits the furnace with the flue gas is called fly ash. Other types of solid particles, called sorbents, may be introduced into the flue gas stream (e.g., lime, powdered activated carbon) for pollutant emission control. Both types of particles may adsorb gaseous Hg in the boiler flue gas.

Sorbents used to capture mercury and other pollutants in flue gas are characterized by their physical and chemical properties. The most common physical characterization is surface area. The interior of certain sorbent particles are highly porous. The surface area of sorbents may be determined using the Brunauer, Emmett, and Teller (BET) method of $N_2$ adsorption. Surface areas of currently used sorbents range from 5 $m^2/g$ for Ca-based sorbents to over 2000 $m^2/g$ for highly porous activated carbons. EPA Report, Control of Mercury Emissions From Coal-Fired Electric Utility Boilers, Interim Report, EPA-600/R-01-109, April 2002. For most sorbents, mercury capture often increases with increasing surface area of the sorbent.

Mercury and other pollutants can be captured and removed from a flue gas stream by injection of a sorbent into the exhaust stream with subsequent collection in a particulate matter control device such as an electrostatic precipitator or a fabric filter. Adsorptive capture of Hg from flue gas is a complex process that involves many variables. These variables include the temperature and composition of the flue gas, the concentration of Hg in the exhaust stream, and the physical and chemical characteristics of the sorbent.

Currently, the most commonly used method for mercury emission reduction is the injection of powdered activated carbon (PAC) into the flue stream of coal-fired and oil-fired plants. Coal-fired combustion flue gas streams are of particular concern because their composition includes trace amounts of acid gases, including $SO_2$ and $SO_3$, NO and $NO_2$, and HCl. These acid gases have been shown to degrade the performance of activated carbon. Though powdered activated carbon (PAC) is somewhat effective to capture oxidized mercury species such as $Hg^{2+}$, PAC is not as effective for elemental mercury, which constitutes a major Hg species in flue gas, especially for subbituminous coals and lignite. The use of brominated powdered activated carbon (BPAC) is described in U.S. Pat. No. 6,953,494. According to U.S. Pat. No. 6,953,494, bromine species were introduced in PAC by a gas-phase process with $Br_2$ or HBr precursor in the vapor phase, both of which are highly toxic and a potential environmental hazard.

The coal-fired utility industry continues to seek new, cost-effective sorbents for controlling mercury emissions while also preserving the value of fly ash as a raw material for quality conscious applications. Evaluations of powdered activated carbon sorbents have shown consistent, adverse impacts on fly ash, a coal utilization by-product, sufficient to render it unusable in cement applications. These impacts include elevated residual carbon levels in the fly ash that exceed application specified limits, interference with the performance of air entrainment additives (AEA), which are used to improve the freeze-thaw properties and workability of cement, and cosmetic discoloration. Efforts are being made in the marketplace to minimize these impacts inherent to carbon based sorbents.

As noted above, alternatives to PAC or BPAC sorbents have been utilized to reduce mercury emissions from coal-fired boilers. Examples of sorbents that have been used for mercury removal include those disclosed in United States Patent Application Publication No. 2003/0103882 and in U.S. Pat. No. 6,719,828. In United States Patent Application Publication No. 2003/0103882, calcium carbonate and kaolin from paper mill waste sludge were calcined and used for Hg removal at high temperatures above 170° C., preferably 500° C. U.S. Pat. No. 6,719,828 teaches the preparation of layered sorbents such as clays with metal sulfide between the clay layers and methods for their preparation. The method used to prepare the layered sorbents is based on an ion exchange process, which limits the selection of substrates to only those having high ion exchange capacity. In addition, ion exchange is time-consuming and involves several wet process steps, which significantly impairs the reproducibility, performance, scalability, equipment requirements, and cost of the sorbent. For example, a sorbent made in accordance with the teachings of U.S. Pat. No. 6,719,828 involves swelling a clay in an acidified solution, introducing a metal salt solution to exchange metal ions between the layers of the clay, filtering the ion exchanged clay, re-dispersing the clay in solution, sulfidation of the clay by adding another sulfide solution, and finally the product is filtered and dried. Another shortcoming of the process disclosed in U.S. Pat. No. 6,719,828 is that the by-products of the ion exchange process, i.e., the waste solutions of metal ions and hydrogen sulfide generated from the acidic solution, are an environmental liability.

There is an ongoing need to provide improved pollution control sorbents and methods for their manufacture. It would be desirable to provide mineral-based sorbents containing bromine on the sorbent substrate that can be manufactured easily and inexpensively, do not impair the value of fly ash or pose environmental concerns. Furthermore, simple and environmentally friendly methods that effectively disperse bromine on readily available mineral substrates are needed

SUMMARY

Aspects of the invention include compositions, methods of manufacture, and systems and methods for removal of heavy metals and other pollutants from gas streams. In particular, the compositions and systems are useful for, but not limited to, the removal of mercury from flue gas streams generated by the combustion of coal. One aspect of the present invention relates to a sorbent made by a method comprising dispersing a bromide salt on a mineral sorbent substrate by impregnating powdered mineral substrate particles with a bromide salt solution followed by drying or by spray-drying a mixture slurry of a bromide salt and a mineral sorbent substrate. In one embodiment, the method optionally includes reducing the particle size of the sorbent particles. Another aspect of the invention pertains to sorbents that include dispersing of a bromide on a sorbent that has low surface area, which significantly improves Hg-capture. Yet another aspect of the present invention provides sorbents and methods to enhance the properties of concrete by adding fly ash that contain injected brominated mineral sorbents.

One or more embodiments pertain to a sorbent comprising bromine-containing species dispersed on mineral substrate particles, the mineral substrate having a total carbon content less than about 10 weight percent, the sorbent being adapted for removing mercury from a combustion flue gas in an exhaust gas system. In one or more embodiments, the carbon content of the particles is less than about 3 weight percent. In other embodiments, the oxidative sorbent compositions contain activated carbon in an amount up to 30% by weight.

According to embodiments of the invention, the mineral substrate particles comprise materials selected from the group consisting of alumina, silica, titania, zirconia, iron oxides, zinc oxide, rare earth oxides, metal carbonate, metal sulfate, aluminosilicates, zeolites, kaolin, heated treated kaolin, chemical-surface modified kaolin, bentonite, attapulgite, talc, fly ash, fluid cracking catalyst particles, dirt, and combinations thereof. When zeolites are used, a particularly useful zeolite is 13X.

In one or more embodiments, the bromine species includes a salt selected from the group consisting of sodium bromide, ammonium bromide, hydrogen bromide, potassium bromide, lithium bromide, magnesium bromide, calcium bromide, beryllium bromide, metal bromide and organic bromide that can release bromide or bromate ions and combinations thereof. According to one or more embodiments, the particles have a bromine content in the range of about 0.1 weight percent and 20 weight percent. In other embodiments, the oxidatively active halide is not limited to bromide, but includes iodide and chloride as well. By "oxidatively active" is meant that the halide is a halide of a nonoxidative, alkaline metal cation, such as sodium, potassium, or alkaline earth metal cations, such as calcium or magnesium. While not wishing to be bound by a particular theory, it is believed that when used in the oxidative sorbent compositions of the present invention, the oxidatively active halides either act as a surface for mercury to bind and become oxidized by oxygen in the fluid stream, or first themselves become oxidized by oxygen in the fluid stream, which can function to oxidize mercury.

In a specific embodiment, the particles are selected from the group consisting of kaolin, FCC fines, and combinations thereof. In another specific embodiment, the particles comprise as-mined kaolin without any beneficiation. In another embodiment, the bromide salt is uniformly dispersed on the surface of the kaolin particles.

Another aspect pertains to a method of making brominated mineral sorbent for the removal of mercury from a combustion gas in an exhaust gas system comprising dispersing a bromide salt in a solid or liquid phase onto mineral sorbent substrate particles, the mineral sorbent substrate particles containing less than about 10 weight percent carbon. In certain embodiments, the carbon content is less than about 3 weight percent. Typically, the carbon is in the form of impurities, that is, carbon that has not been added to the sorbent. However, it is within the scope of the invention to add carbon, for example, by mixing the sorbent with an organic bromide such as methyl bromide. The substrates and salts can be those listed immediate above, according to one or more embodiments. The method may further comprise drying the particles having the bromide salt dispersed thereon at a temperature in the range of about 25° C. and about 200° C. The bromide may have a loading level in the range of about 0.1 to about 20 weight percent, and in specific embodiments, in the range of about of about 3 to about 15 weight percent.

Another aspect pertains to a method of blending cement with fly ash that contains the brominated mineral sorbents. The concentration of the brominated mineral sorbent in fly ash is in the range of 0.01 to 20%.

The method may further include reducing the sorbent particle size to an average particle size of less than about 100 µm, and in specific embodiments, less than about 20 µm. In specific embodiments, the particles comprise FCC fines, and the FCC fines comprise Y-zeolite in Na form. In one or more embodiments, the particles comprise mixture of brominated kaolin and brominated FCC fines. In other embodiments, the particles comprise mixture of brominated fly ash and brominated FCC fines. In other embodiments, the particles comprise mixture of brominated kaolin and one or more mineral substrate. In other embodiments, the particles comprise mixture of brominated fly ash and one or more mineral substrates. In other embodiments, the particles comprise mixture of brominated FCC fines and one or more mineral substrates.

Another aspect pertains to a method of removing mercury from a combustion gas in an exhaust gas system comprising injecting bromine-impregnated particles selected from the group consisting of alumina, silica, titania, zirconia, iron oxides, zinc oxide, rare earth oxides, metal carbonate, metal sulfate, aluminosilicates, zeolites, kaolin, metakaolin, fully calcined kaolin, bentonite, attapulgite, talc, fly ash, fluid cracking catalyst particles, dirt, and combinations thereof, the particles having a total carbon content less than about 10 weight percent, the sorbent being adapted for removing mercury from a combustion gas in an exhaust gas system. In certain embodiments, the particles comprise a spray-dried mixture of kaolin and a bromine salt.

DETAILED DESCRIPTION

Figure 1:
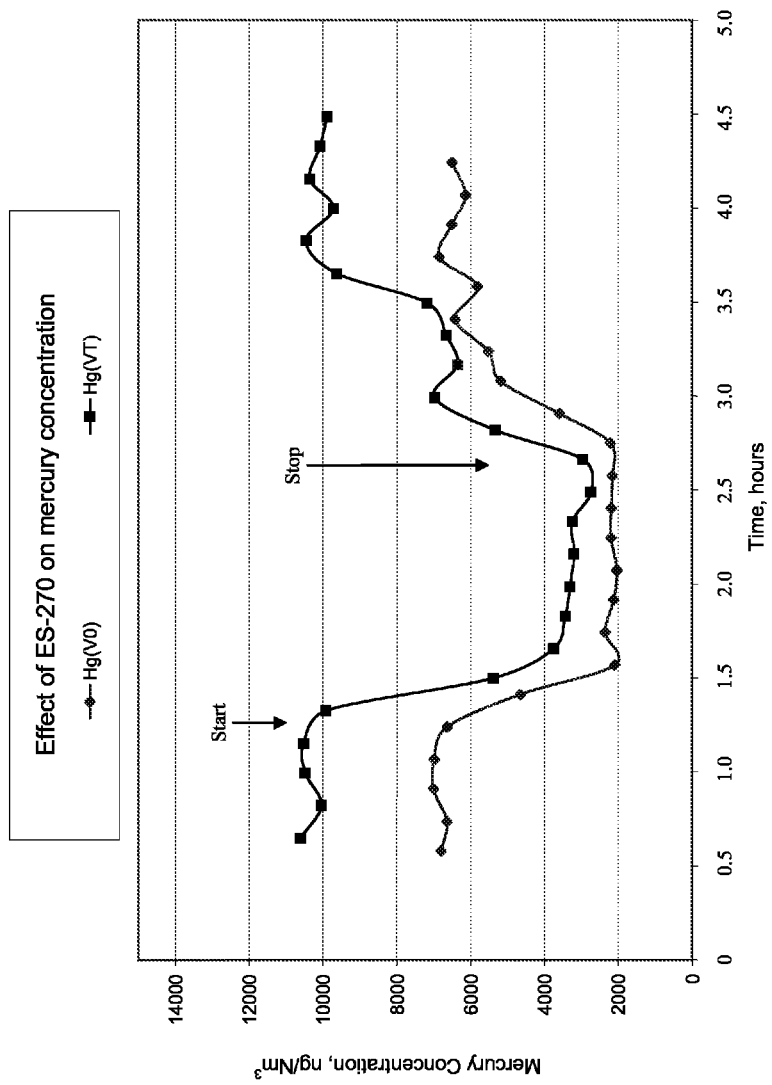
FIG. 1 is a graph showing an ion-flight mercury capture profile of a brominated kaolin sorbent in a drop-tube reactor.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a sorbent" includes a mixture of two or more sorbents, and the like.

Aspects of the invention provide improved sorbents, which may be used to remove mercury and other pollutants from the combustion gases, for example, flue gases of coal-fired and oil-fired boilers, methods for manufacturing such sorbents, and systems and methods utilizing these sorbents. The sorbents comprise brominated substrates in the form of particles having a carbon content of less than about 10 weight percent. A wide variety of substrates, regardless of their porosity, purity, or ion exchange capacity, can be manufactured and used for mercury removal in accordance with the present invention. As used herein, the term substrate refers to the material onto which a bromide salt is dispersed and pollutant is then adsorbed in a pollution removal system.

Suitable substrate sorbent materials in accordance with embodiments of the present invention include any inorganic or organic materials that are stable under the flue gas conditions (temperature, pressure, gas components, residence time, etc). The sorbents according to one or more embodiments comprise particles having carbon content of less than about 10 weight percent, and in specific embodiments, less than about 3 weight percent. Suitable sorbents include, but are not limited to, commonly used oxides such as alumina, silica, titania, zirconia, iron oxides, zinc oxide, rare earth oxides, metal carbonate, metal sulfate, aluminosilicates, zeolites, kaolin, metakaolin, fully calcined kaolin, talc, bentonite, attapulgite, talc, coal boiler fly ash, common dirt, fluid cracking catalyst (FCC) particles, etc.

In specific embodiments, especially useful particles comprise as-mined kaolin. As-mined kaolin refers to kaolin that has been mined and not beneficiated or calcined. In another specific embodiment, especially useful sorbent particles comprise fluid cracking catalyst particles. In other specific embodiments, the sorbent particles comprise fly ash particles. In addition to having favorable properties, these mineral substrates are also cost-effective and environmentally friendly.

Kaolin, also known as kaolinite or hydrous kaolin, is a common clay mineral. Kaolin contains mainly silicon and aluminum in a layered aluminosilicate structure. Kaolin is extensively used for coating, functional filler, ceramics additive and many other applications because of its fine particles size, white color, and inertness, among other chemical and physical properties. Its low cost is also a key factor for its widespread use. Kaolin is also a very important raw material for many industries such as concrete, catalysis, and paper coating after high temperature or chemical treatment. There are small amount of impurities in kaolin, depending on the location of the deposit. For many applications, the impurities in as-mined kaolin, such as $TiO_2$, $Fe_2O_3$, and organic materials or carbonaceous matter, need to be removed, which is known as clay beneficiation. We found that, although kaolin has a low BET surface area, typically 10-30 $m^2/g$, it leads to a surprisingly high mercury capture performance when it is use as a low cost mineral substrate for our brominated sorbents. Furthermore, impurities in as-mined kaolin, such as the organic or carbonaceous materials, actually enhance the overall mercury capture efficiency of the brominated sorbent possibly due to the increase of bonding of bromine species to the substrate and decrease of kaolin's density, stickiness, and water adsorption.

Fly ash is the by-product of coal combustion. After experiencing high temperature combustion in boiler, fly ahs has a bulk chemical composition of aluminosilicate and other inorganic oxides such CaO, MgO, $Fe_2O_3$, and $TiO_2$, depending on the coal source and rank. PRB and sub-bituminous coals have high concentration of CaO in their fly ash. Under electron microscope, fly ash has a morphology of irregular beads or broken beads. The surface area of fly ash is very low, BET surface area below 5 $m^2/g$. It was found that residual unburnt carbon in fly ash can increase the ionic mercury capture. We found that fly ashes, regardless of their coal sources, are all excellent low cost mineral substrate for our brominated sorbents.

FCC particles may be obtained from the end stage or intermediate stage of an FCC particle manufacturing process, or alternatively, they may be generated during a fluid catalytic cracking process that uses FCC particles and generates FCC fine particles. In particular embodiments, the methods and systems utilize fluid cracking catalyst fine particles, which will be interchangeably referred to as "FCC fines" or "FCC fine particles". The fluid cracking catalyst fine particles may be recovered and separated from a fluid cracking catalyst manufacturing process or recovered and separated from a fluid catalytic cracking process that uses FCC particles and generates FCC fines. In specific embodiments, zeolite-containing FCC fines and intermediate FCC fines are provided as sorbents for the removal of mercury from gas streams.

The terms "fluid cracking catalyst fines" or "FCC fines" are used herein to refer to fine solid particles obtained from a fluid cracking catalyst manufacturing process, such as described in, but not limited to U.S. Pat. Nos. 6,656,347 and 6,673,235, and to particles generated and separated during a fluid catalytic cracking process that uses FCC particles. For particles formed during a fluid catalytic cracking particles manufacturing process, the particles may be separated during one or more intermediate stages of the manufacturing process, or at an end stage. A good fluid cracking catalyst requires the particle size above 40 microns. During the production of these FCC catalysts, a large volume of fine particles in the range of about 0 to 40 um in excess of that required for good fluidization in the refinery are often generated. Heretofore, a suitable use for these excess fine particles has not been found, and so they are therefore land-filled, which incurs cost for the plants. The disposal of the FCC waste by-products, referred to as FCC fines, has been a long-standing concern for FCC manufacturing.

Depending on at which stage the FCC fines are collected, the main composition of the particles include zeolite (mostly Y-zeolite in sodium form), kaolin, metakaolin, sodium silicates, silica, and alumina. Thus, the chemical and physical characteristics can be varied considerably based on the FCC production process and post treatment. FCC fines have a BET surface area in the range between 200 to 600 $m^2/g$. The surface area of as-collected FCC fines can be further increased by washing. Heating treatment could also alter the surface area and surface chemical properties of FCC fines particles. Composition, porosity, and particle size can all impact the mercury capture when FCC fines are used as a mercury capture sorbent by itself or as the substrate for the brominated sorbent. The most economical and readily available FCC fines are those collected during the production of Na—Y zeolite. The fines are collected by a filter as a wet cake which can be then dried and ground or spray-dried. Thus, the use of FCC fines in manufacturing a mercury removal injection sorbent described herein not only provides an economical mineral substrate, but also helps solve the FCC waste disposal issue. Furthermore, FCC fines has alone have useful ionic mercury capture capacity, as described in commonly-assigned United States Patent Application Publication No. 2007/0289447 A1, dated Dec. 20, 2007, and entitled, Methods and Manufacturing Mercury Sorbents and Removing Mercury From a Gas Stream. Thus, when used as the substrate for the brominated sorbent or physically blended with a brominated sorbent, FCC fines helps increase the mercury capture efficiency especially ionic mercury.

The sorbent particles according to one or more embodiments of the invention comprise a single-component brominated material. According to other embodiments, the sorbent is a mixture of two or more brominated materials, for example a mixture of brominated kaolin and brominated FCC fines. According to another embodiment, the sorbent comprises a brominated mixture of two or more substrates such as fly ash and FCC fines. Yet according to another embodiment, the sorbent is a mixture of brominated sorbent and a bromine-free substrate, for example a mixture of brominated kaolin and FCC fines.

For a porous brominated sorbent, elemental mercury is oxidized into ionic form due to the bromide, and the ionic mercury is stored inside the pores of the support. Pure zeolites have more cation-exchangeable sites, higher porosity, and thus higher mercury storage capacity than FCC fines, kaolin, or fly ash, though the cost of a pure zolite is usually high. Most commonly used zeolites include aluminosilicate zeolites such A, X, Y, ZSM-5, Beta, chabazite, and titanosilicate zeolites such as ETS-10. Among all the brominated zeolites we have tested, those zeolites, such as 13X, which have the lowest Si/Al ratio, highest surface area and pore volume, and largest pore size gives the highest mercury capture.

Loading

The substrate particles according to one or more embodiments are brominated. In specific embodiments, bromide salts are dispersed on substrate. Non-limiting examples of the bromide salts include sodium bromide, ammonium bromide, hydrogen bromide, potassium bromide, lithium bromide, magnesium bromide, calcium bromide, beryllium bromide, metal bromide, organic bromides that can release bromide or bromate ions and combinations thereof.

The loading level of bromide is up to about 50% by weight. In specific embodiments, the loading is in the range of about 0.1% by weight to about 20% by weight. In a more specific embodiment, the bromine loading is in the range of about 3% by weight to about 15% by weight.

The bromide salts can be dispersed on the surface of the sorbent particles using any method so long as the bromide salt is well dispersed on the surface of the substrate. Some bromine species may get into the pores of the substrates such as Y-zeolite in FCC fines. Suitable dispersion methods include, but are not limited to, impregnation (incipient wetness), solid-state mixing, spray-drying, sprinkling of solution on the substrate, precipitation, and/or co-precipitation. If a solvent is required to disperse the bromide salt, it can be water or an organic solvent. Non-limiting examples of organic solvents are acetone and alcohol.

In a specific embodiment, the sorbent particles comprise about 0.1 to about 10 weight % Br on kaolin or a fly ash. Kaolin and fly ash substrate particles require less bromide salt than other particles that have been investigated to provide an effective sorbent. Also, it is believed that compared to other particles investigated, kaolin and fly ash have less moisture sensitivity. Kaolin also has the desirable property that kaolin particles can be reduced to a smaller sorbent particle size and it has a lower bulk density than fly ash. Although the present invention should not be not bound by any theory, it is believed that the low surface area of kaolin and fly ash allows most of the bromide to be concentrated on the particle surface and thus have a better chance to interact with mercury pollutant species during the short residence time of the sorbent particles in the flue gas.

As noted above, the sorbent particles contain less than 10 weight percent carbon, and in particular embodiments, less than 3 weight percent carbon. Natural impurities in kaolin, such as intercalated organic or carbonaceous species, or the unburned carbon in fly ash may have a positive impact on the sorbent performance as the impurities can modify the sorbent bulk density, surface hydrophobicity, and bonding strength with bromine species.

Large scale sorbent production can be achieved by a spray-drying process which involves dissolving bromide salt in water first, adding mineral substrate to the solution, and then spray-drying the slurry in a standard industrial spray drier. In another embodiment, aqueous solution of bromide salt can be added to a mineral substrate-water slurry before spray drying.

Without intending to limit the invention in any manner, the present invention will be more fully described by the following examples.

EXAMPLES

Examples 1-15

Sorbent Preparation by Impregnation

The general procedures of making a brominated mineral sorbent according to one or more embodiments include (1) dissolving a bromide salt in water; (2) impregnating the solution to the mineral substrate powder using the standard incipient wetness method; and (3) drying the wet solid either at room temperature by vacuum or at a temperature between 100° C. and 200° C., and (4) grinding the dried solid to a particle size below 325 mesh.

Table 1 lists the main ingredients of selected examples of brominated mineral sorbents prepared based on the above procedures using different mineral substrates.

TABLE 1

Selected Brominated Mineral Sorbent Preparations

| Example | Substrate | $W_{substrate}$ (g) | Br Salt | $W_{Br\,Salt}$ (g) | $H_2O$ (g) |
|---|---|---|---|---|---|
| 1 | FCC fines | 23.0 | NaBr | 3.53 | 9.6 |
| 2 | FCC fines | 12.5 | $NH_4Br$ | 1.56 | 7.2 |
| 3 | $CaCO_3$ | 10.5 | NaBr | 1.76 | 2.5 |
| 4 | (50% FCC fines + 50% CaCO3) | 11.5 + 10.5 | NaBr | 3.5 | 12 |
| 5 | Fly ash | 20.0 | NaBr | 1.65 | 2.4 |
| 6 | ATH | 22.0 | NaBr | 1.65 | 13.7 |
| 7 | Metamax | 22.0 | NaBr | 1.65 | 16.2 |
| 8 | Kaolin-1 | 22.0 | NaBr | 1.65 | 7.7 |
| 9 | Kaolin-2 | 22.0 | NaBr | 1.65 | 6.0 |
| 10 | Kaolin-3 | 22.0 | NaBr | 1.65 | 5.2 |
| 11 | Kaolin-1 | 22.0 | $CaBr_2$ | 1.74 | 8.3 |
| 12 | Kaolin-1 | 22.0 | HBr | 4.7 | 4.6 |
| 13 | Kaolin-1 | 22.0 | HBr | 2.6 | 6.4 |
| 14 | FCC fines | — | — | — | — |
| 15 | Kaolin-1 | — | — | — | — |

In table 1, three kaolin samples, -1, -2, and -3, were obtained from BASF without further treatment. Kaolin-1 is an as-mined kaolin containing about 2% naturally intercalated carbon. It has a grayish color. Kaolin-2 is another as-mined sample, containing less than 1% organic matter and having a beige color. Kaolin-3 is a beneficiated sample from Kaolin-2. FCC fines particles were obtained by drying the FCC fines wet cake (obtained from BASF FCC manufacturing plants) at 105° C. overnight followed by grinding or by spray-drying the slurried wet cake in water. Fly ash was obtained from the baghouse of a power plant. Metamax is a BASF metakaolin product which was obtained by heat treatment of kaolin. ATH is an alumina trihydrate product from Chalco in China. $CaCO_3$ (98%) was from Aldrich. HBr (48% aqueous solution), NaBr (99%), and $NH_4Br$ (99%) were all from Alfa Aesar.

Examples 16-17

Sorbent Preparation by Spray-Drying

To make the spray-dried samples, the general procedure comprises dissolving bromide in water first, adding mineral substrate in the solution and stir to make a uniform slurry that is suitable for spray-drying in a standard spray drier. Typical spray-drying outlet temperature is 120° C. The spray drier outlet pressure and nozzles size are chosen in such that the final sorbent particle size is within the required range. Table 2 lists the main ingredients of two spray-dried samples made by two different spray driers.

TABLE 2

Selected Brominated Mineral Sorbent Preparations by spray drying

| Example | Substrate | $W_{substrate}$ (kg) | Br Salt | $W_{Br\,Salt}$ (kg) | $H_2O$ (kg) | Spray-drier |
|---|---|---|---|---|---|---|
| 16 | FCC fines wet cake | 1.57 | NaBr | 0.153 | 3.35 | #1 |
| 17 | Kaolin-1 powder | 159 | NaBr | 11.8 | 409 | #2 |

Example 18

Mercury Capture Effeciency Measurment

The mercury capture efficiency was measured by an outside commercial lab (ICSET of Western Kentucky University) with a drop-tube in-flight reactor. The mercury capture efficiency (%) is defined by Equation 1.

$$100 \times [Hg(inlet) - Hg(outlet)]/[Hg(inlet)] \quad (1)$$

The total mercury is the sum of the ionic and atomic mercury species as illustrated in Equation 2.

$$Hg_{total} = Hg^0 + Hg^{2+} \quad (2)$$

The drop-tube reactor of ICSET was installed at a commercial power plant. The carrier gas was the actual flue gas duct-piped from the boiler. The mercury in the actual flue gas has a distribution of about 70% elemental mercury and 30% ionic mercury. The sorbent was injected into the reactor after being mixed with a fly ash in a ratio of 1:250. The fly ash served as a diluent to help inject the sorbent. The sorbent residence time in the reactor is one second and the sorbent injection rate is typically 4 lbs/MMacf. The measurement was performed at about 150° C. Table 3 lists the mercury capture efficiencies measured by ICSET. For comparison, two reference materials are also listed: Darco-LH BPAC from Norit and pure fly ash.

TABLE 3

ICSET Mercury Capture Efficiency

| Sample | Sorbent | Bromide | Injection rate lbs/MMacf | Capture Efficiency (%) $Hg_{Total}$ | $Hg^0$ |
|---|---|---|---|---|---|
| Reference | Darco-LH | — | 4 | 55 | 64 |
| Reference | Darco-LH | — | 8 | 78 | 85 |
| Reference | Pure fly ash | — | 4 | 13 | 15 |
| Example 1 | 12% Br/FCC fines | NaBr | 4 | 46 | 42 |
| Example 2 | 12% Br/FCC fines | $NH_4Br$ | 4 | 37 | 38 |
| Example 3 | 12% Br/$CaO_3f$ | NaBr | 4 | 52 | 49 |
| Example 4 | 12% Br/($CaCO_3$ + FCC fines) | NaBr | 4 | 44 | 48 |
| Example 5 | 6% Br/Fly ash | $NH_4Br$ | 4 | 41 | 31 |
| Example 6 | 6% Br/ATH | NaBr | 8 | 57 | 71 |
| Example 7 | 6% Br/Metamax | NaBr | 8 | 63 | 72 |
| Example 8 | 6% Br/Kaolin-1 | NnBr | 4 | 52 | 54 |
| Example 9 | 6% Br/Kaolin-2 | NaBr | 4 | 40 | 47 |
| Example 10 | 6% Br/Kaolin-3 | NaBr | 4 | 35 | 46 |
| Example 11 | 6% Br/Kaolin-1 | CaBr2 | 4 | 52 | 60 |
| Example 12 | 6% Br/Kaolin-1 | HBr | 4 | 41 | 37 |
| Example 13 | 11% Br/Kaolin-1 | HBr | 4 | 54 | 68 |
| Example 14 | FCC fines | — | 4 | 26 | 27 |
| Example 15 | Kaolin-1 | — | 4 | 27 | 32 |
| Example 16 | 12% Br/fly ash | NaBr | 4 | 41 | 47 |
| Example 17 | 6% Br/kaolin-1 | NaBr | 4 | 69 | 66 |

Figure 2:
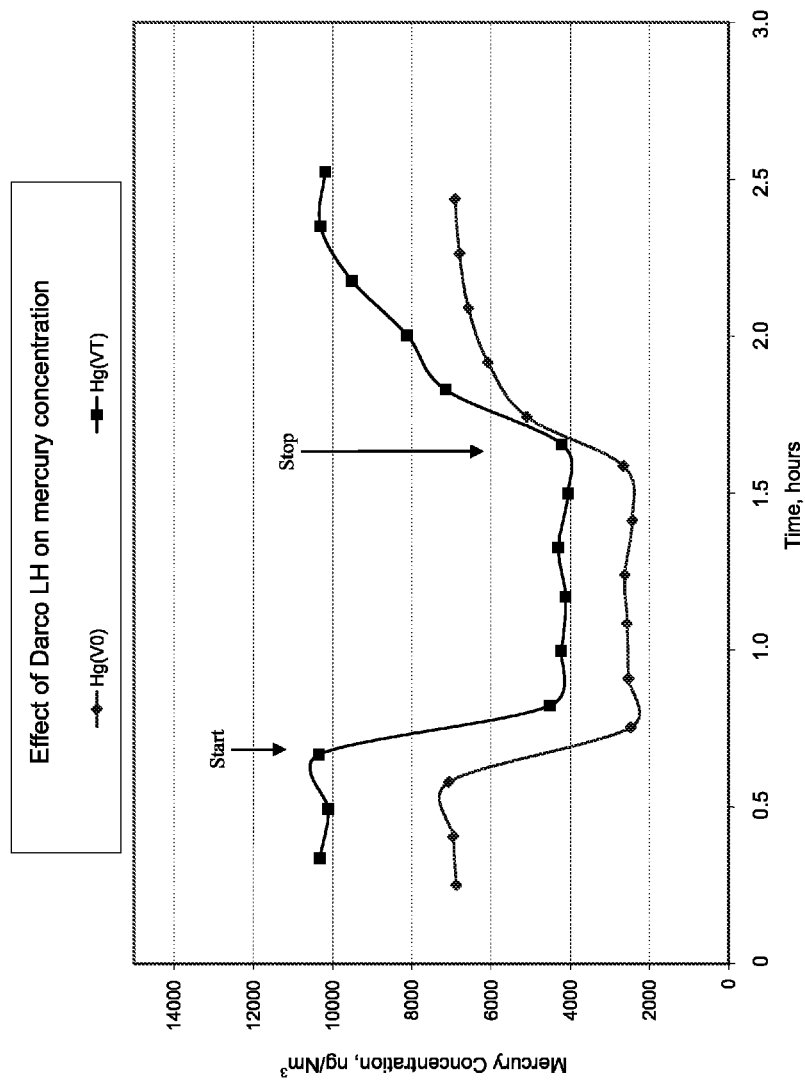
FIG. 2 is a comparative in-flight mercury profile of Br-PAC under the same testing conditions as for the data in FIG. 1.

FIG. 1 shows an in-flight mercury capture profile of a brominated kaolin sorbent in a drop-tube reactor. Note that the mercury concentration drops and recovers after the sorbent injection is started and stopped. FIG. 2 shows a comparative in-flight mercury profile of BPAC under the same testing conditions as for the data in FIG. 1. The in-flight data shows that the brominated mineral sorbent has very similar mercury capture rate (drop slope) and capture efficiency (drop depth) for both elemental mercury Hg(V0) and total mercury Hg(VT) as the comparative BPAC.

Example 19

Mercury Leachability and Cement Application

Mercury leachability is an important property for any injection sorbent due to the environmental concern of their long-term stability after exposure to the nature elements. The brominated mineral sorbents disclosed herein were tested for mercury leachability at ICSET using the standard Toxicity Characteristic Leaching Procedure (TCLP) method. The results showed that the mercury leachability of all the brominated sorbents tested is well below the universal treatment standard value of 25 ppb. The brominated mineral sorbents were also evaluated for their use, after mixing with fly ash, as additives in cement and concrete. Adding fly ash in cement reduces the overall usage of cement, which not only reduces the cost but also finds value for fly ash, a waste by-product of coal combustion. However, there are limits how much the fly ash can be added in the cement so that the properties of the final concrete properties will not be compromised. For example, ASTM C618 requires that the amount of fly ash in concrete should be limited in such that the water used in making concrete should be less than 105% as compared to the control that is without fly ash, the strength activity index (SAI) of concrete after 7 days should be higher than 75% of the control, and the fineness (the particles retained on a 45 μm sieve) should be below 34% while the foam index (number of drops) should be stable and below 20-30.

Table 4 lists the concrete formulations and testing results using cements that contain fly ash or fly ash plus a brominated kaolin sorbent. The data shows that adding 20% of fly ash to cement does not impair the properties of cement and concrete in general. The data also shows that, after adding 5 and 10% by weight brominated kaolin sorbent in the fly ash, the concrete strength activity index is noticeably increased while other properties remain the same. It is clearly indicated that the brominated mineral sorbents disclosed herein do not impair the use of fly ash for cement and concrete application. On the other hand, in some cases, the presence of the brominated mineral sorbents actually enhances the properties of cement and concrete.

TABLE 4

Cement and Concrete Formulation and Testing Results

| Formulation | Control | Fly ash control | Br/kaolin ~2 lbs injection | Br/kaolin ~4 lbs injection |
|---|---|---|---|---|
| Cement | 500 | 400 | 400 | 400 |
| Sand | 1375 | 1375 | 1375 | 1375 |
| Fly Ash | 0 | 100 | 95 | 90 |
| 6% Br/kaolin (Example 17) | 0 | 0 | 5 | 10 |
| W/CM/Water | .484/242 g | .440/220 | .460/230 | .460/230 |

TABLE 4-continued

Cement and Concrete Formulation and Testing Results

| Formulation | Control | Fly ash control | Br/kaolin ~2 lbs injection | Br/kaolin ~4 lbs injection |
|---|---|---|---|---|
| Water Requirement | | | | |
| W/CM/Water | .484/242 g | .440/220 | .460/230 | .460/230 |
| Water Requirement | — | 91 | 95 | 95 |
| Strength Activity 7 Day | | | | |
| Compressive PSI | 4500 | 3680 | 4010 | 4060 |
| SAI | — | 82 | 89 | 90 |
| Cube Density g/cc | 2.21 | 2.22 | 2.23 | 2.23 |
| Fineness | | | | |
| Retained on 45μ sieve % | — | 21.6 | 22.4 | 22.5 |
| Passing 45μ sieve % (Fineness) | — | 78.4 | 77.6 | 77.5 |
| Foam Index Testing | | | | |
| Number of Drops | 5/5/5 | 9/10/9 | 9/9/9 | 10/9/9 |

Example 19

Blended Sorbent Preparation

Blended oxidative sorbent compositions were prepared by the spray-drying method described above. Briefly, bromide salt was first dissolved in water, and 13X zeolite obtained from Sigma-Aldrich was then added to the solution while stirring. The total solid level in the slurry was about 30-40%. All the spray drying work was carried out in a small Niro spray drier. The brominated 13X zeolite powder was physically blended with a commercial activated carbon obtained from Norit, Darco-Hg®, which contains no bromine.

Example 20

Apogee Field Testing

Mercury in-flight capture testing was conducted by Apogee Scientific, Inc. at a utility power plant burning PRB coals. Mercury in-flight capture was conducted in a similar manner as those described above at ICSET except a pure sorbent powder was injected into the flue gas without using any fly ash diluent. Mercury concentration was recorded at 2 and 4 seconds of residence time at outlet ports and compared to the inlet mercury concentration. The residence chamber temperature was maintained at 150° C. A 10% standard deviation with four repeating samples was reported by the testing facility.

Table 1 lists the in-flight capture test data for selected blended preparations of brominated 13X zeolite and Darco-Hg at 4 lb/Mmacf injection rate. For nonblended sorbents with 10 and 7% Br loading (Samples 1 and 2), the total mercury capture, Hg(T), was about 65 and 75% at 2 and 4 second residence time, respectively. Adding 10% Darco-Hg to 10% Br 13X zeolite or 20% Darco-Hg to 7% Br 13X zeolite (Samples 3 and 4) actually caused a decrease of Hg(T). Surprisingly, adding 20% of Darco-Hg in 10% Br 13X zeolite (Sample 5) resulted in a significant increase of Hg(T) to about 86 and 82% at 2 and 4 seconds, respectively.

TABLE 15

Effect of Activated Carbon on the in-flight mercury capture of Selected Brominated 13X Zeolite Preparations

| | | | Total Mercury Capture, % | |
|---|---|---|---|---|
| Sample | Br in 13X Zeolite, % | Darco-Hg in blend, % | Residence Time 2.0 sec | Residence Time 4.0 sec |
| 1 | 10 | 0 | 64 | 76 |
| 2 | 7 | 0 | 65 | 75 |
| 3 | 10 | 10 | 60.0 | 65.0 |
| 4 | 7 | 20 | 60.3 | 60.3 |
| 5 | 10 | 20 | 86.0 | 82.0 |

Figure 3:
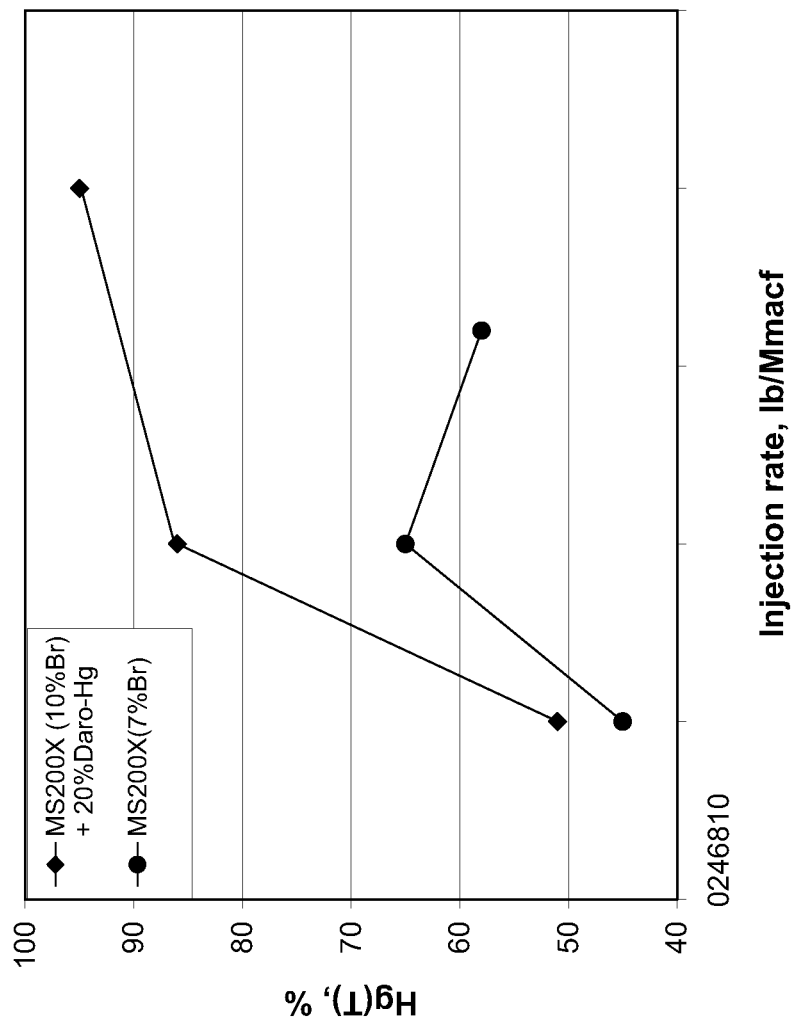
FIG. 3 is a graph showing the total mercury capture of a brominated 13X zeolite sorbent at 2 second residence time with and without the addition of activated carbon at different injection rate.

FIG. 3 shows the total mercury capture of Samples 2 (without activated carbon) and 5 (with activated carbon) at 2 second residence time at different injection rates. For unblended 7% Br 13X zeolite (Sample 2), the mercury capture expectedly increased as the sorbent injection rate was increased from 2 to 4 lb/Mmacf. However, the mercury capture fell sharply at 8 lb/Mmacf possibly due to agglomeration of the sorbent particles when the sorbent pass through the screw feeder. On the other hand, the blend of 10% Br 13X zeolite and 20% Darco-Hg (Sample 5) showed a high total mercury capture up to 95% at 8 lbs injection rate. Thus, the activated carbon not only contributed to the overall mercury capture, but also helped reduce the agglomeration of brominated 13X zeolite particles at high injection rate.

Beside the Examples provided above on a blend of brominated (or other oxidatively active halide) zeolite (or other mineral substrate particle) with a non-brominated activated carbon, blends of brominated activated carbon with a non-brominated zeolite or blends of brominated zeolite and brominated activated carbon can also be used. Besides physically blending, the activated carbon and zeolite can first be blended, followed by bromination of the mixture. Furthermore, when using bromides and 13X zeolite, another mineral substrate particle, such as FCC fines, may be blended in at any preferred ratio to reduce the cost of the oxidative sorbent preparation.

It will be apparent to those skilled in the art that various modifications and variations can be made to the present invention without departing from the spirit or scope of the invention. For example, while the sorbents disclosed herein are particularly useful for removal of mercury from the flue gas of coal-fired boilers, the sorbents can be used to remove heavy metals such as mercury from other gas streams, including the flue gas of municipal waste combustors, medical waste incinerators, and other Hg-emission sources. Thus, it is intended that the present invention cover modifications and variations of this invention provided they come within the scope of the appended claims and their equivalents.

What is claimed is:

1. A method of making brominated mineral sorbent powder for injection into a combustion gas in an exhaust gas system for removal of mercury from the combustion gas, the method comprising dispersing a bromide salt selected from sodium bromide, calcium bromide, potassium bromide, magnesium bromide, and combinations thereof onto mineral sorbent substrate particles by spray-drying a mixture of a slurry of the bromide salt and the mineral sorbent substrate particles to provide the powder for subsequent injection into the exhaust gas system containing mercury, the mineral sorbent substrate particles containing less than about 10 weight percent carbon.

2. The method of claim 1, wherein the substrate particle is selected from the group consisting of kaolin, metakaolin, fully calcined kaolin, and combinations thereof.

3. The method of claim 2, further comprising drying the particles having the bromide salt dispersed thereon at a temperature in the range of about 25° C. and about 200° C.

4. The method of claim 1, wherein the bromide salt has a loading level in the range of about 0.1 to about 20 weight percent.

5. The method of claim 1, wherein the bromide salt has a loading level in the range of about of about 3 to about 15 weight percent.

6. The method of claim 4, further comprising reducing the sorbent particle size to an average particle size of less than about 20 μm.

7. The method of claim 1, wherein the mineral sorbent substrate particles are selected from the group consisting of alumina, silica, titania, zirconia, iron oxides, zinc oxide, rare earth oxides, metal carbonate, metal sulfate, aluminosilicates, zeolites, kaolin, metakaolin, fully calcined kaolin, bentonite, attapulgite, talc, fly ash, dirt, and combinations thereof, the particles having a total carbon content less than about 10 weight percent.

8. The method of claim 6, wherein the mineral sorbent substrate particles are selected from the group consisting of kaolin, metakaolin, fully calcined kaolin, and combinations thereof.

* * * * *